(12) United States Patent
Das (10) Patent No.: US 11,237,545 B2
(45) Date of Patent: Feb. 1, 2022

(54) SYSTEM AND METHOD FOR CONVERTING MANUAL INDUSTRIAL MACHINES INTO AUTOMATIC INDUSTRIAL MACHINES

(71) Applicant: Debashis Das, Pune (IN)

(72) Inventor: Debashis Das, Pune (IN)

(73) Assignee: Debashis Das, Pune (IN)

( * ) Notice: Subject to any disclaimer, the term of this patent is extended or adjusted under 35 U.S.C. 154(b) by 232 days.

(21) Appl. No.: 16/476,851

(22) PCT Filed: Jan. 9, 2018

(86) PCT No.: PCT/IN2018/050012
§ 371 (c)(1),
(2) Date: Jul. 9, 2019

(87) PCT Pub. No.: WO2018/127940
PCT Pub. Date: Jul. 12, 2018

(65) Prior Publication Data
US 2019/0354091 A1    Nov. 21, 2019

(30) Foreign Application Priority Data

Jan. 9, 2017   (IN) .............................. 201621042211

(51) Int. Cl.
*G05B 19/418* (2006.01)
*G06N 5/02* (2006.01)
(Continued)

(52) U.S. Cl.
CPC ..... *G05B 19/41835* (2013.01); *G05D 1/0212* (2013.01); *G06N 5/02* (2013.01); *G05B 2219/34337* (2013.01); *H04L 67/125* (2013.01)

(58) Field of Classification Search
CPC .... G05B 19/41835; G05F 1/0212; G06N 5/02
(Continued)

(56) References Cited

U.S. PATENT DOCUMENTS

2013/0338885 A1* 12/2013 Kirk ..................... G07C 5/008
701/50
2015/0226560 A1* 8/2015 Chandrasekar ......... H04W 4/40
701/532
(Continued)

OTHER PUBLICATIONS

Serizawa et al., Kenaf-Fiber-Reinforced Poly(lactic acid) Used for Electronic Products; Journal of Applied Polymer Science, vol. 100, 618-624 (2006); DOI: 10.1002/app.23377 (Year: 2006).*
(Continued)

*Primary Examiner* — Mohammad Ali
*Assistant Examiner* — Joshua T Sanders
(74) *Attorney, Agent, or Firm* — Barry Choobin; Patent 360LLC (57) ABSTRACT

A system and method are provided for converting a manual industrial machine into an automatic industrial machine through an add-on module and providing predictive maintenance and navigation support to the automatic machines. The add-on module comprises several sensors to measure several parameters to predict impending malfunctions and breakdowns of machine components remotely through a continuous monitoring and analysis of measured parameters. A cloud-based navigation engine is centrally connected to the automatic machines to take real-time decisions through data optimization and navigation algorithms.

14 Claims, 9 Drawing Sheets

(51) Int. Cl.
  *G05D 1/02* (2020.01)
  *H04L 29/08* (2006.01)
(58) Field of Classification Search
  USPC .......................................................... 700/28
  See application file for complete search history.

(56) References Cited

U.S. PATENT DOCUMENTS

2016/0349737 A1* 12/2016 Yen .................... G05B 19/4065
2017/0032281 A1* 2/2017 Hsu ....................... B23K 31/125
2017/0233231 A1* 8/2017 Gariepy ............... G05D 1/0238
                                                               701/2
2018/0084242 A1* 3/2018 Rublee ................. G06K 9/6215

OTHER PUBLICATIONS

Shelton, Debra Kay; Thesis—A selection model for automated guided vehicles. Thesis Virginia Polytechnic Institute, 1985. pp. i-5 (excerpt) Retreived from: https://vtechworks.lib.vt.edu/bitstream/handle/10919/101465/LD5655.V855_1985.S534.pdf?sequence=1 (Year: 1985).*

* cited by examiner

SYSTEM AND METHOD FOR CONVERTING MANUAL INDUSTRIAL MACHINES INTO AUTOMATIC INDUSTRIAL MACHINES

CROSS-REFERENCE TO RELATED APPLICATIONS

This Patent Application is a National Phase Application corresponding to the PCT Application No. PCT/IN2018/050012 filed on Jan. 9, 2018 with the title "A SYSTEM AND METHOD FOR. CONVERTING MANUAL INDUSTRIAL MACHINES INTO AUTOMATIC IN MACHINES". This Patent Application claims the priority of the Indian Provisional Patent Application No. 201621042211 filed on Dec. 9, 2016 and subsequently postdated by 1 Month to Jan. 9, 2017 with the title "SYSTEM AND METHOD FOR AUTOMATING INDUSTRIAL MACHINES", the contents of which is included herein by the way of reference.

BACKGROUND

Technical Field

The embodiments herein are generally related to a field of industrial machines. The embodiments herein are particularly related to manual industrial machines. The embodiments herein are more particularly related to a system and method for convening manual industrial machines into automatic industrial machines and for providing predictive maintenance and navigation support to a plurality of automated industrial machines.

Description of the Related

Industrial automation has been one of the biggest developments in recent times. It has completely redefined the working manner or operating mode of several industries and opened new avenues/eras for development and production of new products.

At present, a lot of new sophisticated industrial robots and automated machines are available in the market for a plurality of tasks/operations. However, a replacement of the manual system into an automatic system in a cost effective manner is very much difficult for people having/using manual machines and systems. At present, no system and method exists for converting a manual industrial machine into an automatic machine by providing end-to-end hardware and predictive maintenance support. Further, no add-on machine is available currently for attaching to a manual system to provide an automatic or semi-automatic and navigation support to the existing machines.

Hence, there is a need for a system and method for convening manual industrial machines into automated industrial machines. Also there is a need for a system and method for providing predictive maintenance and navigation support to a plurality of automated industrial machines.

The above mentioned shortcoming, disadvantages and problems are addressed herein and which will be understood by reading and studying the following specification.

Objectives of the Embodiments Herein

The primary object of the embodiments herein is to provide a system and method for creating automatic industrial machines.

Another object of the embodiments herein is to provide a system and method for converting manual industrial machines into automated industrial machines/robots by attaching an add-on module/upgrade kit to the manual industrial machines.

Yet another object of the embodiments herein is to provide a system and method for providing predictive maintenance and navigation support to a plurality of automated industrial machines.

Yet another object of the embodiments herein is to provide an system and method for monitoring a plurality of operational parameters of the associated automated industrial machines remotely.

Yet another object of the embodiments herein is to provide a system and method to remotely diagnose a hardware problem of an automated industrial machine and to provide a predictive maintenance.

Yet another object of the embodiments herein is to provide a system and method for arranging planned repair services for the automated industrial machines thereby reducing down time of the machines and the overall maintenance cost.

Yet another object of the embodiments herein is to provide a system and method to provide a navigation of automated industrial machine by identifying a plurality of zones within a coverage area, navigating one zone at a time out of all the identified zones, calculating a shortest path to the destination and back to an origin/docking point.

Yet another object of the embodiments herein is to provide server-client architecture for robot navigation for calculating a navigation path on server for plurality of robots and issuing commands back to the individual robot.

Yet another object of the embodiments herein is to provide server-client architecture for calculating a navigation path by the server as well as client thereby providing shared and assisted navigation intelligence.

Yet another object of the embodiments herein is to provide a system and method for prioritizing the one or more industrial machines associated with the system according to requirement and calculating the navigation paths accordingly Yet another object of the embodiments herein is to provide a system and method for configuring pre-defined set of roles to enable diagnosis of any fault/anomaly to the automated industrial machines by comparing the pre-defined rules with the aggregated data from a plurality of sensors.

Yet another object of the embodiments herein is to provide a system and method to enables a safe navigation of the automated industrial machines by avoiding any collision while covering the overall required area.

Yet another object of the embodiments herein is to provide a system and method to provide a web/mobile interface to the user to remotely monitor current status, control operation and performance of the automated industrial machines.

Yet another object of the embodiments herein is to provide a system and method to generate alerts for the administrators/users in case any anomaly is detected in the functioning of the automated industrial machines.

Yet another object of the embodiments herein is to provide a system and method for easily coupling with any type of existing automated industrial machines for remote monitoring and navigation purpose.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The following paragraphs present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The embodiments herein provide a system for converting a manual industrial machine into an automatic industrial machine. The system comprises an add-on module/upgrade kit configured for coupling with an existing manual industrial machine. The add-on module is coupled with the existing manual industrial machines for converting the existing manual industrial machines into an automated industrial machine. The add-on module comprises a plurality of sensors configured for measuring a plurality of parameters related to one or more machine components that are part of each automated industrial machine. The plurality of sensors comprise one or more touch sensitive sensors, one or more ultrasonic sensors, one or more sensors to monitor a plurality of health parameters of the machine components and sensors from motor encoders. The system also comprises a cloud based server communicatively coupled with an individual automated industrial machine associated with the system. The server is configured for collecting the plurality of measured parameters from the add-on module coupled with each automated industrial machine. The server comprises a predictive diagnosis and maintenance engine configured for predicting impending malfunctions and breakdowns of one or more machine components that are part of each automated industrial machine by a continuous monitoring and evaluation of measured parameters. The server also comprises a navigation engine configured for directing a motor controller provided in each add-on module to navigate the automated industrial machine to a desired location.

According to an embodiment herein, the predictive diagnosis and maintenance engine further comprises a data acquisition module configured for acquiring the measured parameters from the plurality of sensors mounted on the add-on module and for storing the measured parameters in a database present in the server.

According to an embodiment herein, the predictive diagnosis and maintenance engine further comprises a rules engine. The rules engine comprises a set of pre-defined rules corresponding to the plurality of operational parameters of the one or more machine components present in each automated industrial machine. The set of pre-defined rules are configured by the administrators based on a historical analysis of the measured parameters collected from one or more automated industrial machines.

According to an embodiment herein, the predictive diagnosis and maintenance engine further comprises a fault diagnostic module configured for diagnosing any fault/anomaly in the automated industrial machine based on data collected from the plurality of sensors and the set of pre-defined rules within the rules engine.

According to an embodiment herein, the predictive diagnosis and maintenance engine further comprises an alerting module and a solution engine configured for generating an alert signal for an administrator/user upon detection of any anomaly/abnormality by the fault diagnostic module, and wherein the alerting module and solution engine is farther configured for proposing a solution for the identified system anomaly based on historical data analysis.

According to an embodiment herein, the predictive diagnosis and maintenance engine further comprises a prediction module configured for predicting future anomalies in the automated industrial machine based on the historical data analysis using one or more deep machine learning algorithms.

According to an embodiment herein, the predictive diagnosis and maintenance engine further comprises a pattern matching and semantic module configured for matching patterns existing in the historical data for analysis purpose.

According to an embodiment herein, the predictive diagnosis and maintenance engine further comprises a performance indicator and analytics module configured for analyzing the performance of each automated industrial machine associated with the system using historical data stored in the database and presenting the derived analytics data.

According to an embodiment herein, the navigation engine is further configured for determining a current location of the automated industrial machine, identifying a plurality of zones within the coverage area, navigating one zone at a time out of all the identified plurality of zones, calculating a shortest path to the destination and calculating a shortest path to the origin/docking point for each automated industrial machine.

According to an embodiment herein, the navigation engine is further configured for issuing coarse navigation commands to the add-on module associated with the automated industrial machine. The add-on module is further configured for calculating fine navigation paths to navigate to the desired location to achieve shared and assisted navigation intelligence.

According to an embodiment herein, the navigation module further comprises a visualization module configured for visually presenting a navigation activity data of each automated industrial machine associated with the system to the administrators and individual users on demand.

According to an embodiment herein, the navigation module further comprises a reporting module configured for generating a plurality of reports related to the navigation activity of each automated industrial machine associated with the system based on historical navigation data stored in the database.

According to an embodiment herein, a base material used for manufacturing the add-on module comprises resin, leather, Fiber Reinforced Plastic (FRP), faux leather, rubber, soft plastic, Polyvinyl Chloride (PVC), flexible silicone, vacuum casted parts and tarpaulin.

According to an embodiment herein, the one or more add-on modules are configured for communicating with the cloud based server using wired or wireless digital communication protocols.

According to an embodiment herein, the system is configured for providing a web or mobile interface to the administrators for monitoring a current position, battery percentage, water tank capacity, system stability and updates of each automated industrial machine and for controlling related operational parameters.

According to an embodiment herein, a method for converting a manual industrial machine into an automatic industrial machine is provided. The method comprises the steps of coupling an add-on module/upgrade kit with an existing manual industrial machine for converting into an automated industrial machine. One or more parameters related to the automated industrial machine is measured using a plurality of sensors provided in the add-on module. The measured data is transmitted to a cloud based server and stored the measured data in a database provided in the server. The impending malfunctions and breakdowns of one or more individual machine components present in each automated industrial machine is predicted through a continuous monitoring and evaluation of measured parameters using one or more deep machine learning algorithms. A navigation path for automated industrial machine is computed based on the current location and a desired location for directing a motor controller provided in each add-on module to navigate the automated industrial machine to the desired location.

According to an embodiment herein, the performance of each automated industrial machine associated with the system is analyzed using historical data stored in the database.

According to an embodiment herein, any fault/anomaly in the automated industrial machine is analyzed based on data collected from the plurality of sensors and a set of pre-defined rules within a rules engine.

According to an embodiment herein, an alert signal is generated and sent to an administrator/user upon detection of any anomaly by the fault diagnostic module and a corrective solution is proposed and estimated for the identified system anomaly based on historical data analysis.

According to an embodiment herein, the method further comprises determining the current location of the automated industrial machine, identifying a plurality of zones within the coverage area of the industry floor, navigating one zone at a time out of all the identified zones, calculating the shortest path to the destination and calculating the shortest path to the origin/docking point for each automated industrial machine.

The embodiments herein disclose a system and method for providing predictive maintenance and navigation support to a plurality of automated industrial machines. The embodiments herein disclose a system and method for converting manual industrial machines into automated industrial machines.

According to an embodiment herein, a system and method are provided for convening manual industrial machines into automated industrial machines. The industrial machines includes manual industrial cleaning machines or vehicles such as wet scrubbers, vacuum cleaners, floor furnishers, floor polishers, sweepers; forklifts of all sizes; material handling machines, including daily use, industrial use or commercial use; trolleys used in hotels, restaurants, supermarkets or warehouses; rail push trolley, horse-drawn trolley or tourist trolley, airline service trolley, boat trolley, flatbed trolley, gurney, hand truck, laptop charging trolley, piano trolley, shopping cart, stroller, trolley pole; industrial vehicles such as container handling vehicles, electric and hybrid vehicles and, vehicles used in defense purposes.

According to an embodiment herein, a system and method are provided for converting manual industrial machines into automated industrial machines. A manual industrial machine is converted to an automated industrial machine by providing the manual machine with an add-on layer. The add-on layer comprises a plurality of sensors including one or more touch sensitive sensors, one or more ultrasonic sensors, one or more sensors to monitor the health parameters of the to machine, one or more sensors from motor encoders and one or more sensors to communicate with other machines and computing devices through wired or wireless medium. The base material of the add-on layer is made up of fabric such as resin, leather, FRP, Faux leather, any flexible material, rubber, soft plastic, PVC, flexible silicone, vacuum casted parts or tarpaulin. The add-on layer further comprises a plurality of mechanisms to enable an external computing device to communicate with the automated industrial machine through a plurality of wired or wireless, digital communication protocols.

According to an embodiment herein, a system and method are provided for predictive diagnosis and maintenance of an automated industrial machine. The system comprises a remote cloud-based predictive maintenance and diagnostics engine. The system is configured to predict the impending malfunctions and breakdowns of machine components by permanent condition monitoring and data evaluation. The permanent condition monitoring and data evaluation is performed through a sensor technology, an intelligent analysis of large amounts of data, a digital networking and corresponding communication from a plurality of automated industrial machines, parts and components. The system is configured to continuously evaluate a data and an information from a system network and provide the collected and evaluated information for maintenance. A plurality of trends derived from continuous analysis and comparison of actual and set point values provides a complete information of a system status/condition. A higher availability of machines, better performance/throughput of installed systems and a possibility to monitor robots increases efficiency, reduces costs, improves system availability/capacity factor and extends service life of the automated industrial machines.

According to an embodiment herein, a plurality of sensors is provided on the add-on layer to monitor the one or more health parameters of a plurality of components provided in the automated industrial machine. The measured sensor data is sent to the server over wired or wireless communication protocols. The measured sensor data is monitored and analyzed in the server to predict maintenance issues, provide pro-active customer care and zero down time.

According to an embodiment herein, a navigation engine is provided. The navigation engine is cloud-based and centrally connected to a plurality of automated industrial machines. The navigation engine is configured to perform a data optimization on board-level and send the information collected from the plurality of automated industrial machines to a server. The server is configured to perform a plurality of mathematical calculations based on the algorithms provided in the navigation engine to enable the plurality of automated industrial machines to take real-time decisions.

According to an embodiment herein, an automated industrial machine is provided. The automated industrial machine comprises a manual cleaning machine and a wearable add-on layer.

According to an embodiment herein, a system for automating industrial machines comprises a wearable add-on layer, a plurality of computing devices, a robot navigation engine, a remote cloud diagnostics engine and a deep learning engine.

According to an embodiment herein, a predictive maintenance and diagnostics system comprises automated industrial machines, robot management systems and an artificial intelligence powered predictive maintenance and diagnostics engine.

According to an embodiment herein, a robot navigation server comprises a cloud storage module, a visualization framework module, a mapping engine, a streaming computation processor, a reporting module, a batch computation processor and an integration module According to an embodiment herein, the layers in the robot navigation system comprise an application layer, a server layer and a database layer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a system for converting a manual industrial machine into an automatic industrial machine. The system comprises an add-on module/upgrade kit configured for coupling with an existing manual industrial machine. The add-on module is coupled with the existing manual industrial machines for converting the existing manual industrial machines into an automated industrial machine. The add-on module comprises a plurality of sensors configured for measuring a plurality of parameters related to one or more machine components that are part of each automated industrial machine. The plurality of sensors comprise one or more touch sensitive sensors, one or more ultrasonic sensors, one or more sensors to monitor a plurality of health parameters of the machine components and sensors from motor encoders. The system also comprises a cloud based server communicatively coupled with an individual automated industrial machine associated with the system. The server is configured for collecting the plurality of measured parameters from the add-on module coupled with each automated industrial machine. The server comprises a predictive diagnosis and maintenance engine configured for predicting impending malfunctions and breakdowns of one or more machine components that are part of each automated industrial machine by a continuous monitoring and evaluation of measured parameters. The server also comprises a navigation engine configured for directing a motor controller provided in each add-on module to navigate the automated industrial machine to a desired location.

According to an embodiment herein, the predictive diagnosis and maintenance engine further comprises a data acquisition module configured for acquiring the measured parameters from the plurality of sensors mounted on the add-on module and the storing the measured parameters in a database present in the server.

According to an embodiment herein, the predictive diagnosis and maintenance engine further comprises a rules engine. The rules engine comprises a set of pre-defined rules corresponding to the plurality of operational parameters of the one more machine components present in each automated industrial machine. The set of pre-defined rules are configured by the administrators based on a historical analysis of the measured parameters collected from one or more automated industrial machines.

According to an embodiment herein, the predictive diagnosis and maintenance engine further comprises a fault diagnostic module configured for diagnosing any fault/anomaly in the automated industrial machine based on data collected from the plurality of sensors and the set of predefined rules within the rules engine.

According to an embodiment herein, the predictive diagnosis and maintenance engine further comprises an alerting module and a solution engine configured for generating an alert signal for an administrator/user upon detection of any anomaly/abnormality by the fault diagnostic module, and wherein the alerting module and solution engine is further configured for proposing a solution for the identified system anomaly based on historical data analysis.

According to an embodiment herein, the predictive diagnosis and maintenance engine further comprises a prediction module configured for predicting future anomalies in the automated industrial machine based on the historical data analysis using one or more deep machine learning algorithms.

According to an embodiment herein, the predictive diagnosis and maintenance engine further comprises a pattern matching and semantic module configured for matching patterns existing in the historical data for analysis purpose.

According to an embodiment herein, the predictive diagnosis and maintenance engine further comprises a performance indicator and analytics module configured for analyzing the performance of each automated industrial machine associated with the system using historical data stored in the database and presenting the derived analytics data.

According to an embodiment herein, the navigation engine is further configured for determining a current location of the automated industrial machine, identifying a plurality of zones within the coverage area, navigating one zone at a time out of all the identified plurality of zones, calculating a shortest path to the destination and calculating a shortest path to the origin/docking point for each automated industrial machine.

According to an embodiment herein, the navigation engine is further configured for issuing coarse navigation commands to the add-on module associated with the automated industrial machine. The add-on module is further configured for calculating fine navigation paths to navigate to the desired location to achieve shared and assisted navigation intelligence.

According to an embodiment herein, the navigation module further comprises a visualization module configured for visually presenting a navigation activity data of each automated industrial machine associated with the system to the administrators and individual users on demand.

According to an embodiment herein, the navigation module further comprises a reporting module configured for generating a plurality of reports related to the navigation activity of each automated industrial machine associated with the system based on historical navigation data stored in the database.

According to an embodiment herein, abase material used for manufacturing the add-on module comprises resin, leather, Fiber Reinforced Plastic (FRP), faux leather, rubber, soft plastic, Polyvinyl Chloride (PVC), flexible silicone, vacuum casted parts and tarpaulin.

According to an embodiment herein, the one or more add-on modules are configured for communicating with the cloud based server using wired or wireless digital communication protocols.

According to an embodiment herein, the system is configured for providing a web or mobile interface to the administrators for monitoring a current position, battery percentage, water tank capacity, system stability and updates of each automated industrial machine and for controlling related operational parameters.

According to an embodiment herein, a method for converting a manual industrial machine into an automatic industrial machine is provided. The method comprises the steps of coupling an add-on module/upgrade kit with an existing manual industrial machine for converting into an automated industrial machine. One or more parameters related to the automated industrial machine is measured using a plurality of sensors provided in the add-on module. The measured data is transmitted to a cloud based server and stored the measured data in a database provided in the server. The impending malfunctions and breakdowns of one or more individual machine components present in each automated industrial machine is predicted through a continuous monitoring and evaluation of measured parameters using one or more deep machine learning algorithms. A navigation path for automated industrial machine is computed based on the current location and a desired location for directing a motor controller provided in each add-on module to navigate the automated industrial machine to the desired location.

According to an embodiment herein, the performance of each automated industrial machine associated with the system is analyzed using historical data stored in the database.

According to an embodiment herein, any fault/anomaly in the automated industrial machine is analyzed based on data collected from the plurality of sensors and a set of predefined rules within a rules engine.

According to an embodiment herein, an alert signal is generated and sent to an administrator/user upon detection of any anomaly by the fault diagnostic module and a corrective solution is proposed and estimated for the identified system anomaly based on historical data analysis.

According to an embodiment herein, the method further comprises determining the current location of the automated industrial machine, identifying a plurality of zones within the coverage area of the industry floor, navigating one zone at a time out of all the identified zones, calculating the shortest path to the destination and calculating the shortest path to the origin/docking point for each automated industrial machine.

The embodiments herein disclose a system and method for providing predictive maintenance and navigation support to a plurality of automated industrial machines. The embodiments herein disclose a system and method for converting manual industrial machines into automated industrial machines.

According to an embodiment herein, a system and method are provided for converting manual industrial machines into automated industrial machines. The industrial, machines includes manual industrial cleaning machines or vehicles such as wet scrubbers, vacuum cleaners, floor furnishers, floor polishers, sweepers; forklifts of all sizes; material handling machines, including daily use, industrial use or commercial use; trolleys used in hotels, restaurants, supermarkets or warehouses; rail push trolley, horse-drawn trolley or tourist trolley, airline service trolley, boat trolley, flatbed trolley, gurney, hand truck, laptop charging trolley, piano trolley, shopping cart, stroller, trolley pole; industrial vehicles such as container handling vehicles, electric and hybrid vehicles; and, vehicles used in defense purposes.

According to an embodiment herein, a system and method are provided for convening manual industrial machines into automated industrial machines. A manual industrial machine is converted to an automated industrial machine by providing the manual machine with an add-on layer. The add-on layer comprises a plurality of sensors including one or more touch sensitive sensors, one or more ultrasonic sensors, one or more sensors to monitor the health parameters of the machine, one or more sensors from motor encoders and one or more sensors to communicate with other machines and computing devices through wired or wireless medium. The base material of the add-on layer is made up of fabric such as resin, leather, FRP, Faux leather, any flexible material, rubber, soft plastic, PVC, flexible silicone, vacuum casted parts or tarpaulin. The add-on layer further comprises a plurality of mechanisms to enable an external computing, device to communicate with the automated industrial machine through a plurality of wired or wireless, digital communication protocols.

According to an embodiment herein, a system and method are provided for predictive diagnosis and maintenance of an automated industrial machine. The system comprises a remote cloud-based predictive maintenance and diagnostics engine. The system is configured to predict the impending malfunctions and breakdowns of machine components by permanent condition monitoring and data evaluation. The permanent condition monitoring and data evaluation is performed through a sensor technology, an intelligent analysis of large amounts of data, a digital networking and corresponding communication from a plurality of automated industrial machines, parts and components. The system is configured to continuously evaluate a data and an information from a system network and provide the collected and evaluated information for maintenance. A plurality of trends derived from continuous analysis and comparison of actual and set point values provides a complete information of a system status/condition. A higher availability of machines, better performance/throughput of installed systems and a possibility to monitor robots increases efficiency, reduces costs, improves system availability/capacity factor and extends service life of the automated industrial machines.

According to an embodiment herein, a plurality of sensors is provided on the add-on layer to monitor the one or more health parameters of a plurality of components provided in the automated industrial machine. The measured sensor data is sent to the server over wired or wireless communication protocols. The measured sensor data is monitored and analyzed in the server to predict maintenance issues, provide pro-active customer care and zero down time.

According to an embodiment herein, a navigation engine is provided. The navigation engine is cloud-based and centrally connected to a plurality of automated industrial machines. The navigation engine is configured to perform a data optimization on board-level and send the information collected from the plurality of automated industrial machines to a server. The server is configured to perform a plurality of mathematical calculations based on the algorithms provided in the navigation engine to enable the plurality of automated industrial machines to take real-time decisions.

According, to an embodiment herein, an automated industrial machine is provided. The automated industrial machine comprises a manual cleaning machine and a wearable add-on layer.

According to an embodiment herein, a system for automating industrial machines comprises a wearable add-on layer, a plurality of computing devices, a robot navigation engine, a remote cloud diagnostics engine and a deep learning engine.

According to an embodiment herein, a predictive maintenance and diagnostics system comprises automated industrial machines, robot management systems and an artificial intelligence powered predictive maintenance and diagnostics engine.

According to an embodiment herein, a robot navigation server comprises a cloud storage module, a visualization framework module, a mapping engine, a streaming computation processor, a reporting module, a batch computation processor and an integration module According to an embodiment herein, the layers in the robot navigation system comprise an application layer, a server layer and a database layer.

Figure 1:
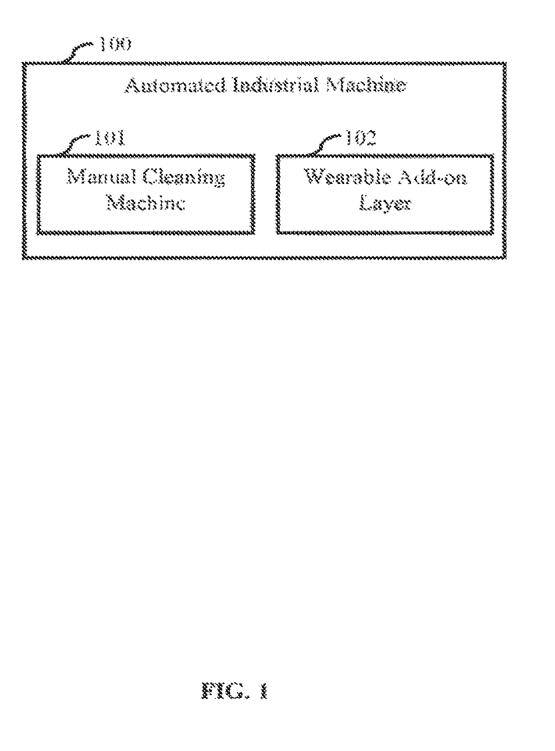
FIG. 1 illustrates a block diagram of an automated industrial machine, according to an embodiment herein.

FIG. 1 illustrates a block diagram of an automated industrial machine, According to an embodiment herein. The automated industrial machine 100 comprises a manual cleaning machine 101 and a wearable add-on layer 102.

Figure 2:
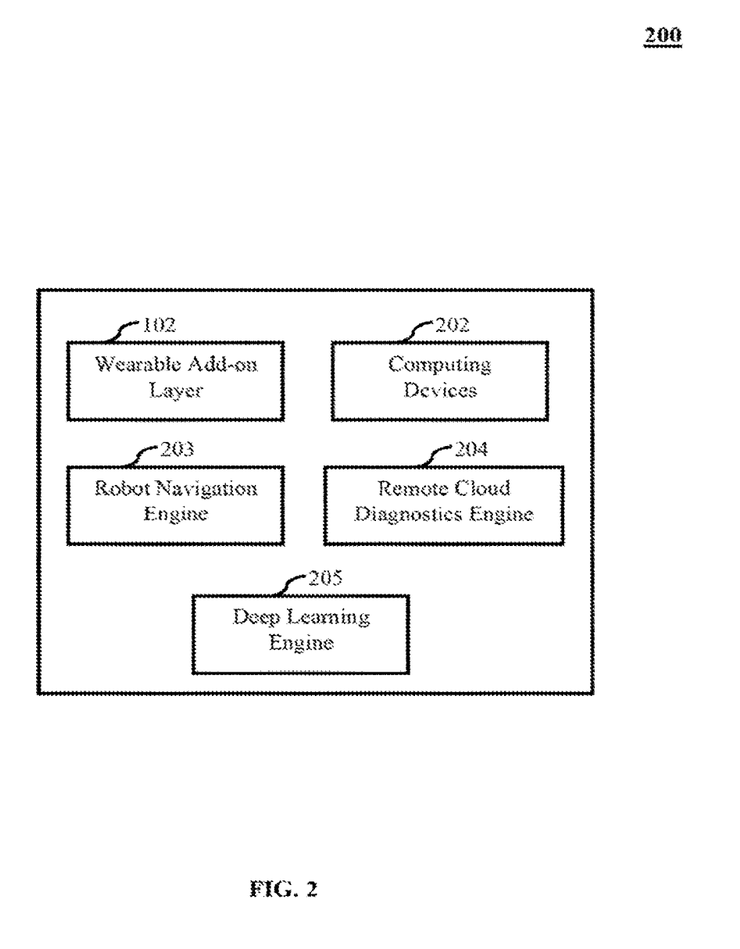
FIG. 2 illustrates a functional block diagram of a system for automating industrial machines, according to an embodiment herein.

FIG. 2 illustrates an architecture diagram of a system for automating industrial machines. According to an embodiment herein. The architecture comprises a wearable add-on layer 102, a plurality of computing devices 202, a robot navigation engine 203, a remote cloud diagnostics engine 204 and a deep learning engine 205.

Figure 3:
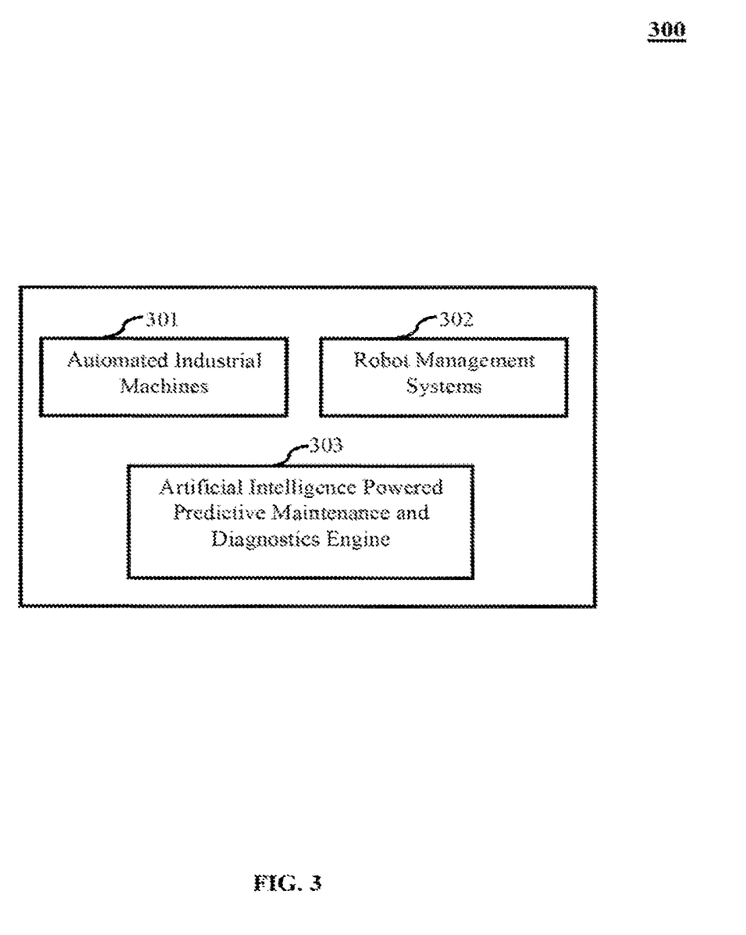
FIG. 3 illustrates a functional block diagram of a predictive maintenance and diagnostics system for an automatic industrial machine, according to an embodiment herein.

FIG. 3 illustrates an architecture diagram of a predictive maintenance and diagnostics system. According to an embodiment herein. The architecture comprises automated industrial machines 301, robot management systems 302 and an artificial intelligence powered predictive maintenance and diagnostics engine 303.

Figure 4:
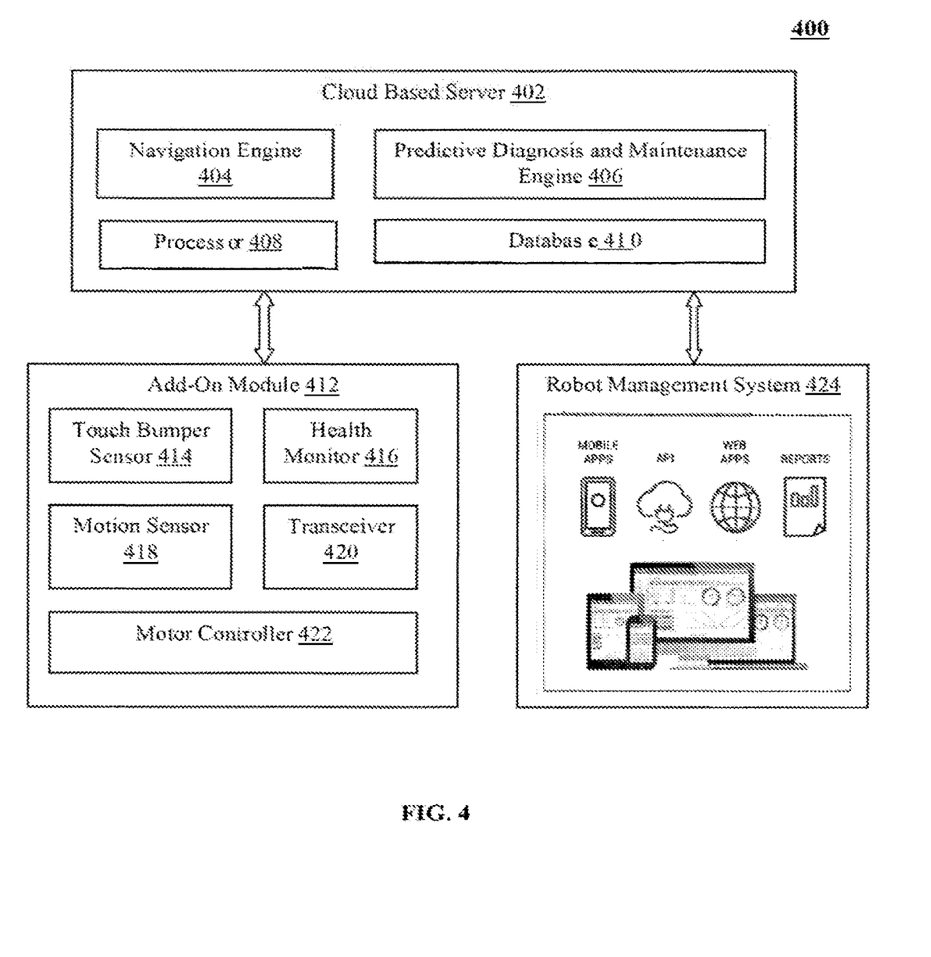
FIG. 4 illustrates a functional block diagram of a system for automating industrial machines, indicating the plurality of components provided in a cloud based server, an add-on module and a root management system, according to an embodiment herein.

FIG. 4 illustrates a detailed architecture diagram of a system for automating industrial machines, according to an embodiment herein. With respect to FIG. 4, the system comprises the cloud based server 402, the add-on module 412 and the robot management system 424. The add-on module 412 comprises a plurality of sensors configured for sensing one or more parameters related to the automated industrial machine. The plurality of sensors include, but are not limited to, one or more touch sensitive sensors 414, ultrasonic sensors, sensors to monitor the health parameters of the machine 416, motion sensors 418, sensors from motor encoders and the like.

According to an embodiment herein, the cloud based server 402 is communicatively coupled with individual add-on module 412 associated with the system and is configured for gathering the sensed parameters from the plurality of sensors for each add-on module 412. The one or more add-on modules 412 are configured for communicating with the cloud based server 402 using wired or wireless digital communication protocols. The cloud based server 402 further comprises the predictive diagnosis and maintenance engine 406 configured for predicting impending malfunctions and breakdowns of one or more individual machine components that are part of each automated industrial machine through continuous monitoring and sensed parameter valuation. The cloud based server 402 further comprises the navigation engine 408 configured for directing a motor controller 422 that is part of each add-on module 412 to navigate the automated industrial machine to a desired location.

According to an embodiment herein, the system is configured for providing a robot management system 424 to the administrators/users. The robot management system comprises a web or mobile interface for monitoring current position, battery percentage, water tank capacity, system stability and updates of each automated industrial machine and for controlling related operational parameters.

Figure 5:
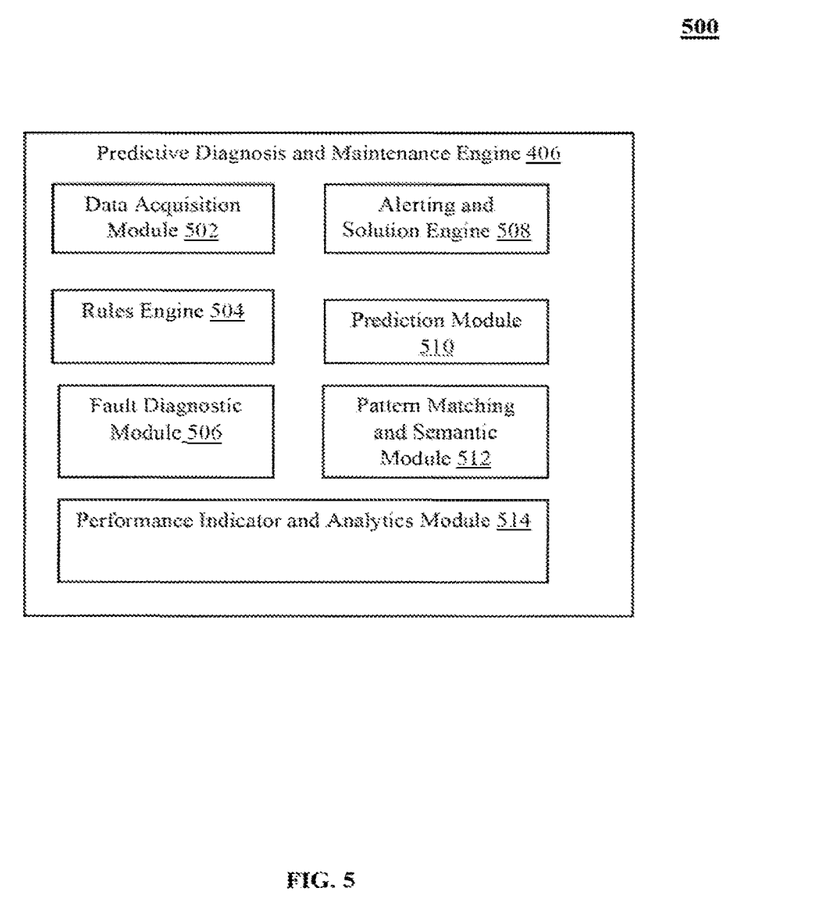
FIG. 5 illustrates a block diagram of the Predictive Diagnosis and Maintenance Engine, in a system for automating industrial machines, according to an embodiment herein.

FIG. 5 illustrates an internal block diagram of the Predictive Diagnosis and Maintenance Engine, according to an embodiment herein. With respect to FIG. 5, the Predictive Diagnosis and Maintenance Engine comprises the data acquisition module 502, the rules engine 504, the fault diagnostic module 506, the alerting and solution engine 508, the prediction module 510, the pattern matching and semantic module 512 and the performance indicator and analytics module 514.

According to an embodiment herein, the data acquisition module 502 is configured for acquiring sensed parameters from the plurality of sensors mounted on the add-on module 412 and for storing the sensed parameter data as part of a database 410 present in the server 402. The rules engine 504 comprises a set of pre-defined rules corresponding to the plurality of operational parameters of the one or more machine components that are part of each automated industrial machine. The set of pre-defined rules are configurable by the administrators based on historical analysis of sensed parameters gathered from one or more automated industrial machines. The fault diagnostic module 506 is configured for diagnosing an fault/anomaly in the automated industrial machine based on data aggregated from the plurality of sensors and the set of pre-defined rules within the rules engine 504. The alerting and solution engine 508 is configured for generating an alert signal for an administrator/user upon detection of any anomaly b the fault diagnostic module 506. The alerting and solution engine 508 is further configured for proposing a solution for the identified system anomaly based on historical data analysis. The prediction module 510 is configured for predicting future anomalies in the automated industrial machine based on the historical data analysis using one or more deep machine learning algorithms. The pattern matching and semantic module 512 is configured for matching patterns existing in the historical data for analysis purpose. The performance indicator and analytics module 514 is configured for analyzing the performance of each automated industrial machine associated with the system using historical data stored in the database 410 and for presenting the derived analytics data.

Figure 6:
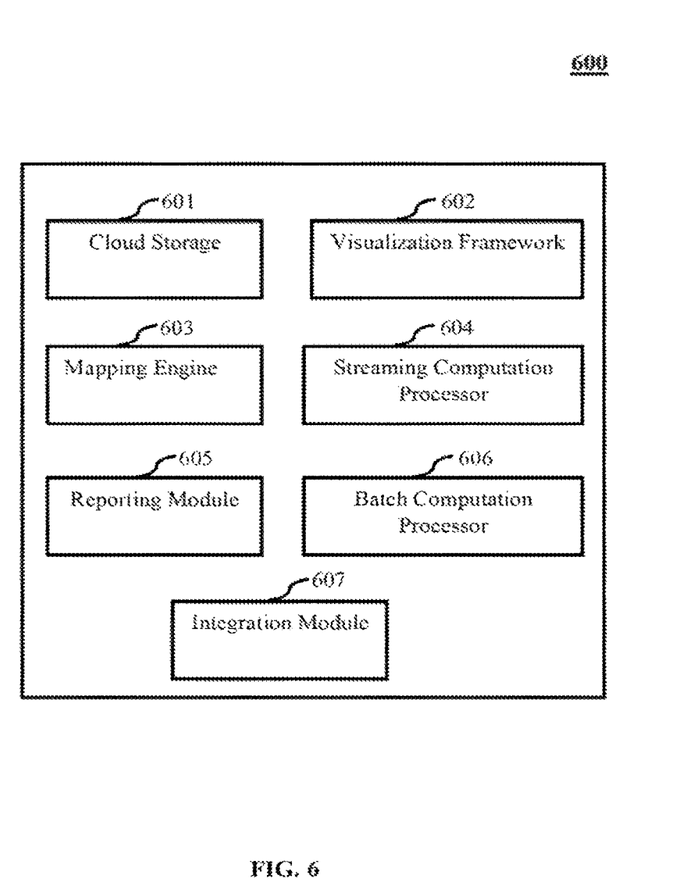
FIG. 6 illustrates a block diagram of a robot navigation server, in a system for automating industrial machines, according to an embodiment herein.

FIG. 6 illustrates an architecture diagram of a robot navigation server, According to an embodiment herein. The architecture comprises a cloud storage module, a visualization framework module, a mapping engine, a streaming computation processor, a reporting module, a batch computation processor and an integration module. The navigation engine 404 is configured for determining the current location of the automated industrial machine, identifying a plurality of zones within the coverage area, navigating one zone at a time out of all the identified zones, calculating the shortest path to the destination and calculating the shortest path to the origin/docking point for each automated industrial machine. The navigation engine 404 is further configured for issuing coarse grain navigation commands to the add-on module associated with the automated industrial machine. The add-on module is further configured for calculating fine granular navigation paths to navigate to the desired location to achieve shared and assisted navigation intelligence. The visualization module 602 present in the navigation engine 404 is configured for visually presenting the navigation activity data of each automated industrial machine associated with the system to the administrators and individual users on demand. Further, a plurality of reports related to the navigation activity of each automated industrial machine associated with the system are generated by the reporting module 605 based on historical navigation data stored in the database 410.

Figure 7:
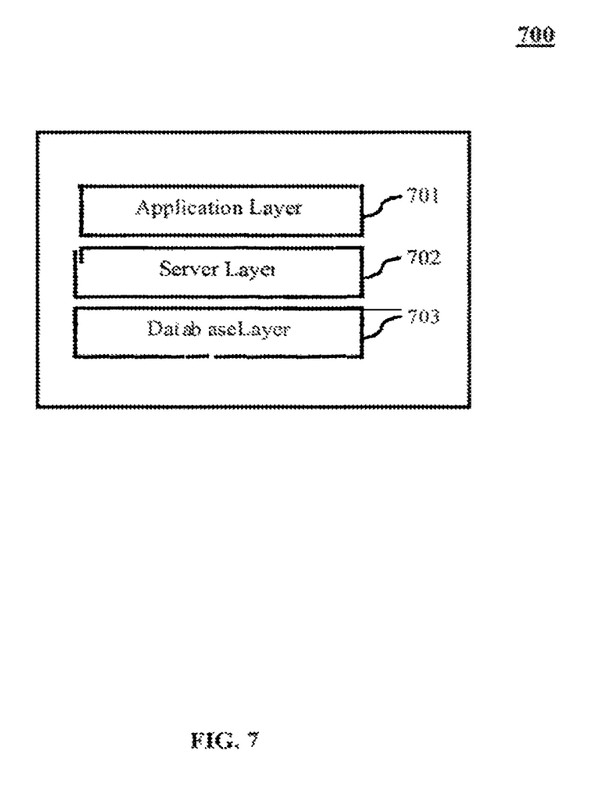
FIG. 7 illustrates a block diagram of a robot navigation system in a system for automating industrial machines, according to an embodiment herein.

FIG. 7 illustrates the layers in the robot navigation architecture. According to an embodiment herein. The layers comprise an application layer 701, a server layer 702 and a database layer 703.

Figure 8:
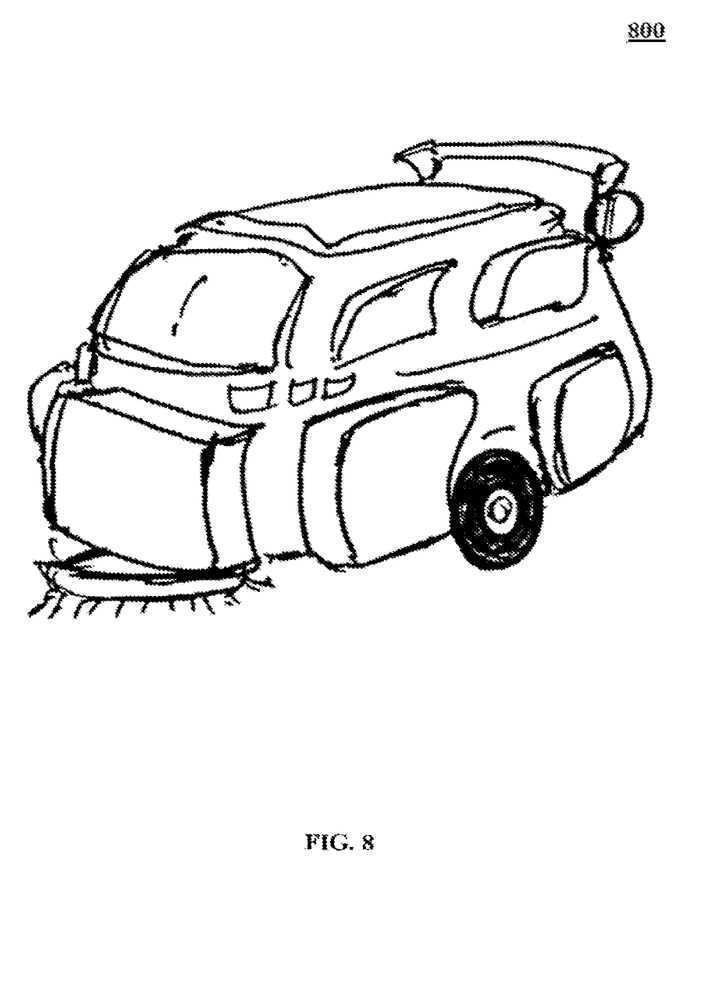
FIG. 8 illustrates a perspective view of an automated industrial machine, according to an embodiment herein.

FIG. 8 illustrates an exemplary automated industrial machine. According to an embodiment herein.

Figure 9:
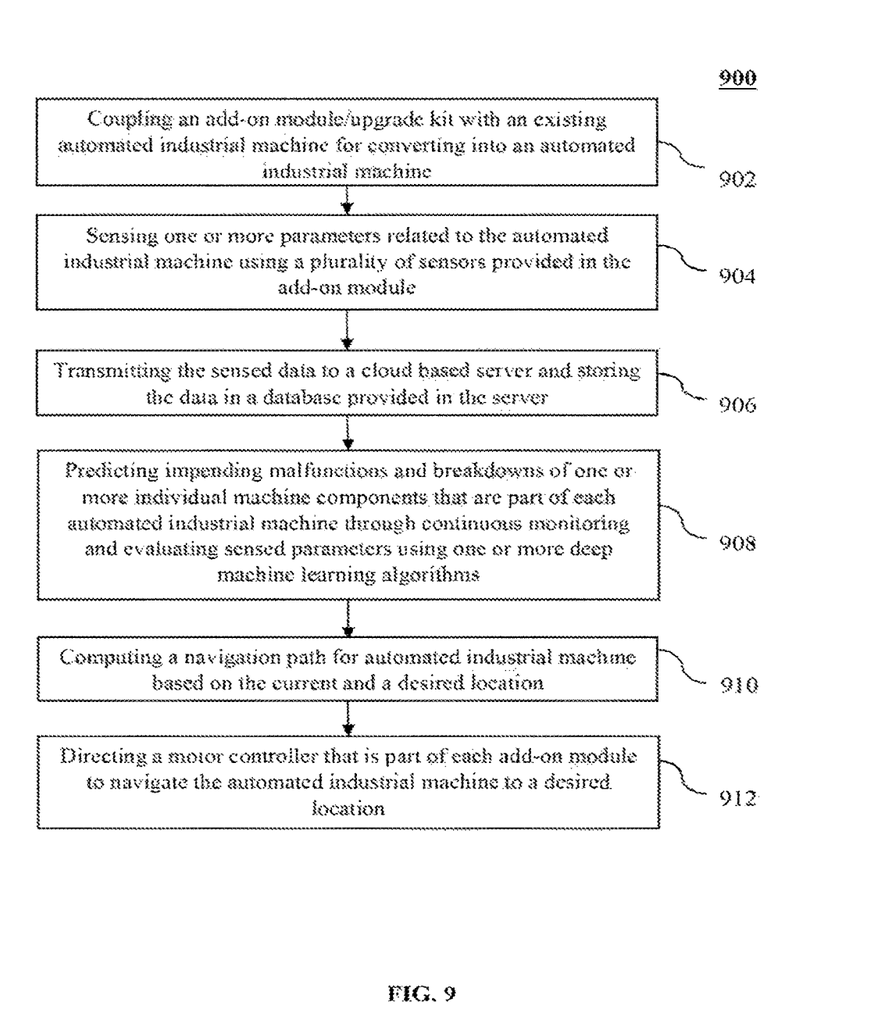
FIG. 9 illustrates a flow chart explaining a method, for automating industrial machines, according to an embodiment herein.

FIG. 9 illustrates a flow chart depicting a method for automating industrial machines, according to an embodiment herein. The method comprises the steps of coupling an add-on module/upgrade kit with an existing automated industrial machine for converting into an automated industrial machine (902). The method also comprises sensing one or more parameters related to the automated industrial machine using a plurality of sensors provided in the add-on module (904). The method further comprises transmitting the sensed data to a cloud based server and storing the data in a database provided in the server (906). The method still further comprises predicting impending malfunctions and breakdowns of one or more individual machine components that are part of each automated industrial machine through continuous monitoring and evaluating sensed parameters using one or more deep machine learning algorithms (908). The method still further comprises computing, navigation path for automated industrial machine based on the current and a desired location and directing a motor controller that is part of each add-on module to navigate the automated industrial machine to a desired location.

Therefore, the system and method provides predictive maintenance and navigation support to a plurality of automated industrial machines. The system and method also enables converting manual industrial machines into automated industrial machines. The system and method provides an add-on layer to any existing manual industrial machine to convert the machine into automated industrial machine. The add-on layer comprises a plurality of sensors to enable the automation. The invention provides a predictive maintenance and diagnostics engine, which enables measurably, lower maintenance and repair costs for the automated industrial machines. The predictive maintenance and diagnostics engine also offers advantages such as availability of machinery and equipment through less machine downtime, new maintenance strategy aims to avoid unforeseen failures and consequently to reduce or exclude associated production bottlenecks, predictive maintenance with planned repairs instead of unplanned ones, reduction of maintenance efforts and costs, percentage of unplanned downtime is decreased by 70 percent and foresee malfunctions and breakdowns. The invention also comprises a navigation engine that enables complete area coverage for mobile automated industrial machines through effective navigation.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is have the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be the to fall there between.

What is claimed is:

1. A system for converting manual industrial machines into automated industrial machines, the system comprising:
an add-on module configured for coupling with an existing manual industrial machine, and wherein the add-on module is configured to convert the manual industrial machine into an automated industrial machine, and wherein the add-on module comprises a plurality of sensors configured for measuring a plurality of parameters related to one or more machine components in the automated industrial machine, and wherein the plurality of sensors comprise one or more touch sensitive sensors, one or more ultrasonic sensors, one or more sensors to monitor a plurality of health parameters of the one or more machine components and sensors for motor encoders;
a server communicatively coupled with a plurality of automated industrial machines, and wherein the server is configured for collecting the plurality of measured parameters from the plurality of sensors present in each add-on module coupled with each automated industrial machine;
a predictive diagnosis and maintenance engine provided in the server and run on a hardware processor, and wherein the predictive diagnosis and maintenance engine is configured for predicting a plurality of impeding malfunctions and breakdowns of one or more machine components provided in each automated industrial machine by a monitoring and evaluation of the measured parameters; and
a navigation engine in the server, and wherein the navigation engine is run on a hardware processor, and wherein the navigation engine is configured for directing a motor controller provided in the each add-on module to navigate the automated industrial machine to a desired location;
wherein the predictive diagnosis and maintenance engine further comprises a rules engine, and wherein the rules engine comprises a set of pre-defined rules corresponding to the plurality of operational parameters of the one or more machine components provided in each automated industrial machine, and wherein the set of pre-defined rules are configured by a plurality of administrators based on historical analysis of the measured parameters collected from the one or more automated industrial machines, and wherein the predictive diagnosis and maintenance engine further comprises a pattern matching and semantic module, and wherein the pattern matching and semantic module is configured for matching patterns existing in the historical data for analysis, and wherein the navigation engine is further configured for determining a current location of the automated industrial machine, identifying a plurality of zones within a coverage area, navigating one zone at a time out of the identified plurality of zones, calculating a shortest path to the destination and calculating a shortest path to one of an origin and a docking point for each automated industrial machine, and wherein a web is provided to the plurality of administrators for monitoring a current position, battery percentage level, a water tank capacity, a system stability and updates of each automated industrial machine for controlling an operational parameter.

2. The system according to claim 1, wherein the predictive diagnosis and maintenance engine further comprises a data acquisition module, and wherein the data acquisition module is configured for acquiring the measured parameters from the plurality of sensors mounted on the add-on module and for storing the measured parameters in a database present in the server.

3. The system according to claim 1, wherein the predictive diagnosis and maintenance engine further comprises a fault diagnostic module, and wherein the fault diagnostic module is configured for diagnosing one or more faults and anomalies in each automated industrial machine based on the measured parameters collected from the plurality of sensors and the set of pre-defined rules within the rules engine.

4. The system according to claim 3, wherein the predictive diagnosis and maintenance engine further comprises an alerting module and solution engine, and wherein the alerting module and solution engine is configured for generating an alert signal for one or more users upon detection of any anomaly by the fault diagnostic module, and wherein the alerting and solution engine is further configured for estimating and providing a corrective a solution for the identified system anomaly based on historical data analysis.

5. The system according to claim 1, wherein the predictive diagnosis and maintenance engine further comprises a prediction module, and wherein the prediction module is configured for predicting future anomalies in the automated industrial machine based on the historical data analysis using one or more machine learning algorithms.

6. The system according to claim 2, wherein the predictive diagnosis and maintenance engine further comprises a performance indicator and analytics module, and wherein the performance indicator and analytics module is configured for analyzing the performance of each automated industrial machine associated with the system using historical data stored in the database and presenting a summary of the analyzed data.

7. The system according to claim 1, wherein the navigation engine is further configured for navigation commands to the add on module associated with the automated industrial machine, and wherein the add on module is further configured for calculating navigation paths to navigate to a desired location to achieve shared and assisted navigation intelligence.

8. The system according to claim 1, wherein the navigation module further comprises a visualization module, and wherein the visualization module is configured for visually presenting a navigation activity data of each automated industrial machine associated with the system to the plurality of administrators and individual users on demand.

9. The system according to claim 2, wherein the navigation module further comprises a reporting module, and wherein the reporting module is configured for generating a plurality of reports related to the navigation activity of each automated industrial machine associated with the system based on historical navigation data stored in the database.

10. The system according to claim 1, wherein a base material used for manufacturing the add-on module comprises any one of resin, leather, Fiber Reinforced Plastic (FRP), faux leather, rubber, soft plastic, Polyvinyl Chloride (PVC), flexible silicone, vacuum casted parts and tarpaulin.

11. The system according to claim 1, wherein the plurality of sensors is configured for communicating with the server using wired or wireless digital communication protocols.

12. A computer implemented method comprising instructions stored on a non-transitory computer readable storage medium and run on a computing device provided with a hardware processor and memory for converting manual industrial machines into automated industrial machines, the method comprising the steps of:
- measuring one or more parameters related to an automated industrial machine, obtained by coupling an add-on module, by using a plurality of sensors provided in the add-on module;
- transmitting the measured data to a server and storing the data in a database provided in the server;
- predicting impending malfunctions and breakdowns of one or more individual machine components provided in each automated industrial machine through monitoring and evaluation of the measured parameters using one or more machine learning algorithms;
- computing a navigation path for automated industrial machine based on a current location and a desired location;
- directing a motor controller provided in each add-on module to navigate the automated industrial machine to the desired location;
- generating an alert signal upon detection of any anomaly by the fault diagnostic module;
- forwarding the generated alert signal to one or more users;
- estimating a corrective solution for an identified system anomaly based on historical data analysis;
- forwarding the corrective solution to the automated industrial machine for corrective action;
- determining a current location of the automated industrial machine;
- identifying a plurality of zones within a coverage area of the industry floor;
- navigating one zone at a time out of the identified plurality of zones;
- calculating a shortest path to the destination; and
- calculating a shortest path to any one of an origin and a docking point for each automated industrial machine.

13. The method according to claim 12 further comprises analyzing a performance of each automated industrial machine using historical data stored in the database.

14. The method according to claim 12 further comprises diagnosing one or more faults and anomalies in the automated industrial machine based on the measured one or parameters collected from the plurality of sensors and a set of pre-defined rules provided within a rules engine.

* * * * *